March 18, 1930. M. V. CLARK ET AL 1,750,992
MOUNTING MEANS FOR SNAP FASTENERS
Filed Nov. 14, 1928
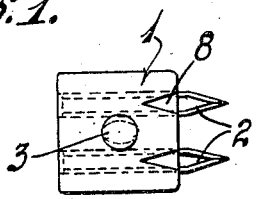
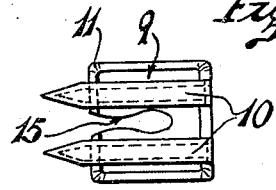
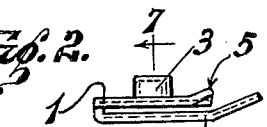
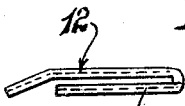
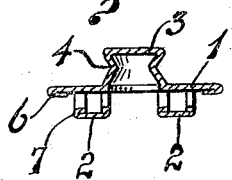
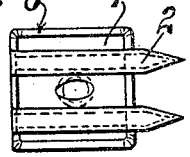
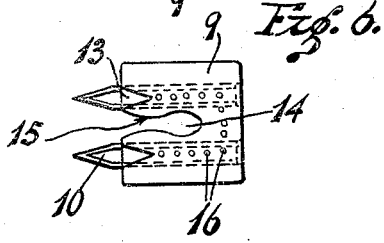
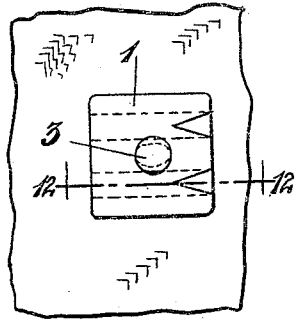
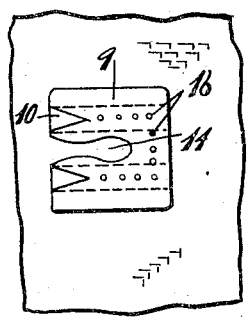
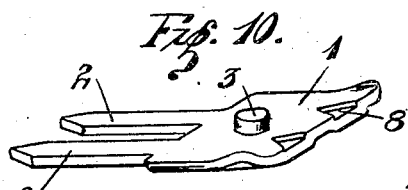
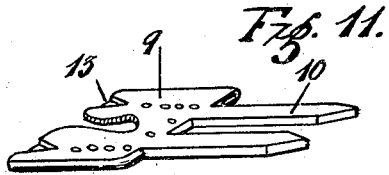
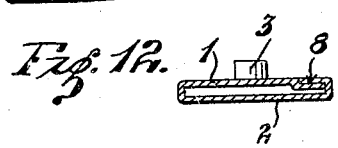
INVENTOR.
Mabel V. Clark
Cecil F. Clark
by
ATTORNEY.

Patented Mar. 18, 1930

1,750,992

UNITED STATES PATENT OFFICE

MABEL V. CLARK AND CECIL F. CLARK, OF JERSEY CITY, NEW JERSEY

MOUNTING MEANS FOR SNAP FASTENERS

Application filed November 14, 1928. Serial No. 319,332.

This invention relates to mounting means for fasteners, and the like, and an object of our invention is to provide a fastener which is easily and quickly placed in position and which will be positively held once it is placed in the cloth.

A further object is to provide a fastener of the character stated which will not injure the cloth in which it is mounted and also cannot be easily unfastened or disturbed once it is clamped in position.

Still another object is to provide a fastener which is simple in construction and inexpensive to manufacture.

Other objects, advantages, and features of invention may appear from the accompanying drawing, the subjoined detailed description, and the appended claims.

In the drawing:

Figure 1 is a plan view of the stud section of the fastener.

Figure 2 is a side view of the same.

Figure 3 is a bottom plan view of the same.

Figure 4 is a bottom plan view of the socket side of the fastener.

Figure 5 is a side elevation of the same.

Figure 6 is a top plan view of the same.

Figure 7 is an enlarged sectional view, taken on line 7, 7 of Figure 2.

Figure 8 is a plan view of the stud element mounted in the cloth.

Figure 9 is a top plan view of the socket element when mounted.

Figure 10 is an enlarged perspective view of the stud element after it is cut from the metal and before it is bent.

Figure 11 is a perspective view of the socket element after it is cut and prior to bending.

Figure 12 is a sectional view taken on line 12, 12 of Figure 8.

Referring more particularly to the drawing, we will first describe the element of our fastener and this comprises a top plate 1 which may be in any desired shape but we have here shown it as rectangular. A pair of prongs 2, 2 are cut from the same piece of material as the plate 1 and are integral therewith. The outer ends of the prongs are pointed so that they will readily perforate the cloth. A stud 3 projects upwardly from the plate 1 and is adapted to engage the other member of the fastener, all of which is usual and well-known.

The sides of the stud 3 are dented inwardly as at 4, so that it will more readily enter the other fastener member and when in position the indented sides will prevent relative rotation of the two fastener members. The edge of the plate 1 is preferably raised, as at 5, and this raised edge or edges bearing against the other fastener member will serve to better hold the stud in position and prevent it from accidentally slipping out of engagement.

The lower edge of the plate 1 is rolled over, as at 6, so that a smooth surface is presented to the cloth and there is no danger of tearing or otherwise mutilating the material. The edges of the prongs 2 are also rolled over, as at 7, for the same purpose.

A pair of indentations 8 are provided in the upper surface of the plate 1 and the pointed ends of the prongs 2 are adapted to be bent over and extend into these indentations, as shown in Figure 8, thus securely holding the fastener element in position. These recesses also serve to prevent accidental side displacement of the prongs and also protects the points of the prongs so that they will not accidentally catch in the material. We prefer that the ends of the prongs 2 shall be bent slightly upwardly, as shown in Figure 2, so that they can be more readily bent over into the recesses 8.

The socket element of the fastener comprises a plate 9 and a pair of integrally formed prongs 10, said prongs being pointed in the same manner as the prongs 2. The lower edge of the plate 9 is rolled over, as at 11, and the edges of the prongs are also rolled, as at 12, for the same purpose as previously stated. A pair of indentations 13 are provided in the upper face of the plate 9 to receive the pointed ends of the prongs 10.

A slot 14 is cut in the plate 9 between the prongs 10 and this slot is provided with a constricted neck 15 so that the stud 3 is securely held when it is pushed into the slot. If desired, indentations 16 may be provided in plates 9, 1, the purpose of which is to extend into the cloth when the fastener is mounted and thus prevent the cloth from slipping along the prongs 2 or 10.

Having described our invention, we claim:

1. An interlocking fastening device comprising a stud element and a socket element, each of said elements including a plate, a pair of prongs, said prongs being adapted to be bent under said plate, and the ends of said prongs being adapted to be bent over onto the top of said plate.

2. An interlocking fastening device comprising a stud element and a socket element, each of said elements including a plate, a pair of prongs, said prongs being adapted to be bent under said plate, and the ends of said prongs being adapted to be bent over onto the top of said plate, said plate having indentations therein into which the ends of the prongs are adapted to extend.

3. An interlocking fastening device comprising a stud element and a socket element, each of said elements comprising a plate, a pair of integrally formed prongs on the plate, said prongs being adapted to be bent under said plate, said plate having indentations in the top thereof adapted to receive the ends of the prongs, said plate being rolled at the edge thereof, and the edges of said prongs being bent over whereby mutilation of the cloth is prevented.

4. An interlocking fastening device comprising a stud element and a socket element, each of said elements comprising a plate, a pair of integrally formed prongs on the plate, said prongs being adapted to be bent under said plate, said plate having indentations in the top thereof adapted to receive the ends of the prongs, said stud element including a stud projecting from the plate, and said socket element having a slot formed therein, said slot having a constricted neck portion.

5. An interlocking fastening device comprising a stud element and a socket element, each of said elements including a plate, a pair of prongs integrally formed with said plate, said prongs being adapted to be bent under said plate, and the ends of said prongs being adapted to be bent over onto the top of said plate, said plate having indentations therein into which the ends of the prongs are adapted to extend, said plate having a plurality of depressions therein which serve to prevent slipping of the elements when mounted.

In testimony whereof, we affix our signatures.

MABEL V. CLARK.
CECIL F. CLARK.